(12) United States Patent
Ge et al.

(10) Patent No.: US 11,734,090 B2
(45) Date of Patent: *Aug. 22, 2023

(54) AUTHORIZATION REVOCATION METHOD, AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/677,464

(22) Filed: Feb. 22, 2022

(65) Prior Publication Data

US 2022/0179721 A1 Jun. 9, 2022

Related U.S. Application Data

(63) Continuation of application No. 16/928,215, filed on Jul. 14, 2020, now Pat. No. 11,275,634, which is a
(Continued)

(30) Foreign Application Priority Data

Jan. 15, 2018 (CN) .......................... 201810035792.4

(51) Int. Cl.
*G06F 9/54* (2006.01)

(52) U.S. Cl.
CPC .............. *G06F 9/546* (2013.01); *G06F 9/547* (2013.01)

(58) Field of Classification Search
CPC .......... G06F 9/546; G06F 9/547; G06F 9/448; G06F 9/4482; G06F 21/629; G06F 9/451; H04W 12/082
See application file for complete search history.

(56) References Cited

U.S. PATENT DOCUMENTS

| | | | |
|---|---|---|---|
| 11,275,634 B2* | 3/2022 | Ge | G06F 9/448 |
| 2006/0075464 A1* | 4/2006 | Golan | G06F 21/604 |
| | | | 726/1 |

(Continued)

FOREIGN PATENT DOCUMENTS

| | | |
|---|---|---|
| CN | 103460215 | 4/2014 |
| CN | 104350501 | 2/2015 |

(Continued)

OTHER PUBLICATIONS

Lodderstedt et al., "OAuth 2.0 Token Revocation" (Aug. 2013), pp. 1-11 [retrieved from https://www.rfc-editor.org/rfc/pdfrfc/rfc7009.txt.pdf]. (Year: 2013).*

(Continued)

*Primary Examiner* — Brian W Wathen

(74) *Attorney, Agent, or Firm* — Fish & Richardson P.C.

(57) ABSTRACT

This application discloses an authorization revocation method and an apparatus, and relates to the communications field. An example method includes: receiving, by a first entity, an authorization revocation request message from a second entity, wherein the authorization revocation request message carries an identifier of an application programming interface (API) invocation entity; and sending, by the first entity, an authorization revocation response message to the second entity based on the authorization revocation request message, wherein the authorization revocation response message indicates that authorization revocation succeeds or fails.

20 Claims, 9 Drawing Sheets

Related U.S. Application Data continuation of application No. PCT/CN2018/121719, filed on Dec. 18, 2018.

(56) References Cited

U.S. PATENT DOCUMENTS

| | | | |
|---|---|---|---|
| 2006/0137007 | A1 | 6/2006 | Paatero et al. |
| 2012/0144459 | A1 | 6/2012 | Nguyen et al. |
| 2014/0040993 | A1 | 2/2014 | Lorenzo et al. |
| 2014/0380428 | A1 | 12/2014 | Kobayashi |
| 2017/0041793 | A1* | 2/2017 | Lee .................. G06F 21/629 |
| 2017/0099292 | A1 | 4/2017 | Kelley et al. |
| 2017/0220793 | A1 | 8/2017 | Birgisson et al. |
| 2017/0351513 | A1 | 12/2017 | Chou et al. |
| 2019/0149576 | A1* | 5/2019 | Rajadurai ........... H04L 63/0823 713/151 |

FOREIGN PATENT DOCUMENTS

| | | |
|---|---|---|
| CN | 102710640 | 3/2015 |
| CN | 105678359 | 6/2016 |
| CN | 105763514 | 7/2016 |
| CN | 106713018 | 5/2017 |
| CN | 107025400 | 8/2017 |
| CN | 108768717 | 11/2018 |
| JP | 2012098839 | 5/2012 |
| JP | 2015005222 | 1/2015 |
| JP | 2016024475 | 2/2016 |

OTHER PUBLICATIONS

3GPP TS 23.222 V1.0.0 (Dec. 2017), "3rd Generation Partnership Project, Technical Specification Group Services and System Aspects, Functional architecture and information flows to support Common API Framework for 3GPP Northbound APIs, Stage 2 (Release 15)," Dec. 2017, 79 pages.

3GPP TS 23.222 V15.0.0 (Jan. 2018), "3rd Generation Partnership Project, Technical Specification Group Services and System Aspects, Functional architecture and information flows to support Common API Framework for 3GPP Northbound APIs, Stage 2 (Release 15)," Jan. 2018, 79 pages.

Extended European Search Report issued in European Application No. 18899249.9 dated Jan. 14, 2021, 7 pages.

Lodderstedt et al., "OAuth 2.0 Token Revocation," Internet Engineering Task Force (IETF), Request for Comments: 7009, Aug. 2013, 11 pages.

Office Action issued in Chinese Application No. 201810035792.4 dated Aug. 11, 2021, 5 pages.

Office Action issued in Chinese Application No. 201810035792.4 dated Jan. 27, 2021, 24 pages (with English translation).

Office Action issued in Indian Application No. 202047028434 dated Jul. 27, 2021, 8 pages.

Office Action issued in Japanese Application No. 2020-538982 dated Jan. 25, 2022, 5 pages (with English translation).

PCT International Search Report and Written Opinion in International Application No. PCT/CN2018/121719, dated Mar. 15, 2019, 18 pages (with English Translation).

* cited by examiner

AUTHORIZATION REVOCATION METHOD, AND APPARATUS

CROSS-REFERENCE TO RELATED APPLICATIONS

This application is a continuation of U.S. application Ser. No. 16/928,215, filed on Jul. 14, 2020, which is a continuation of International Patent Application No. PCT/CN2018/121719, filed on Dec. 18, 2018, which claims priority to Chinese Patent Application No. 201810035792.4, filed on Jan. 15, 2018. All of the afore-mentioned patent applications are hereby incorporated by reference in their entireties.

TECHNICAL FIELD

This application relates to the field of communications technologies, and in particular, to an authorization revocation method and an apparatus.

BACKGROUND

In a common API framework (CAPIF) system, an application programming interface (API) invocation entity obtains API invocation authorization from a common API framework core function (CCF) in the CAPIF system, and then the API invocation entity can perform one or more times of API invocation with the authorization.

There are many API invocation entities and APIs in the CAPIF, and different APIs may be located on different API exposing functions (AEF) in the CAPIF. Therefore, API invocation authorization management is relatively complex. For example, authorization may expire or may be invalidated. However, only an authorization process of the API invocation entity is provided in the prior art. Therefore, further improvement is required.

SUMMARY

Embodiments of this application provide an authorization revocation method, so that API invocation authorization management can be improved, and efficiency of a CAPIF system is improved.

To achieve the foregoing objective, the following technical solutions are used in the embodiments of this application:

According to a first aspect, an authorization revocation method is provided. The method includes: receiving, by a first entity, an authorization revocation request message from a second entity, where the authorization revocation request message carries an identifier of an API invocation entity; and sending, by the first entity, an authorization revocation response message to the second entity based on the authorization revocation request message. In the method, API invocation authorization management is improved, so that API invocation authorization can be revoked in a timely manner, thereby avoiding resource waste caused by invoking an API by an API invocation entity that already has no API invocation authorization (in other words, the API invocation authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

With reference to the first aspect, in a first possible implementation of the first aspect, the method further includes: when the authorization revocation request message further carries an API identifier, revoking, by the first entity, authorization to invoke an API corresponding to the API identifier by the API invocation entity; or when the authorization revocation request message further carries an API identifier and an AEF identifier, revoking, by the first entity, authorization to invoke, by the API invocation entity, an API that is on an AEF corresponding to the AEF identifier and that is corresponding to the API identifier. The authorization revocation request message may be used to flexibly revoke API invocation authorization of the API invocation entity.

With reference to the first aspect, in a second possible implementation of the first aspect, the authorization revocation request message carries no API identifier, and the method further includes: revoking, by the first entity, authorization to invoke all APIs on a common API framework core function CCF corresponding to the API invocation entity by the API invocation entity; or when the authorization revocation request message further carries an AEF identifier, revoking, by the first entity, authorization to invoke all APIs on an AEF corresponding to the AEF identifier by the API invocation entity; or when the authorization revocation request message further carries a specific value, revoking, by the first entity, authorization to invoke all APIs on a CCF corresponding to the API invocation entity by the API invocation entity. The authorization revocation request message may be used to flexibly revoke authorization on different scales, for example, may be used to revoke the authorization to invoke all the APIs on the CCF, or may be used to revoke the authorization to invoke all the APIs on the AEF.

With reference to the first aspect or either of the foregoing possible implementations, in a third possible implementation of the first aspect, the method further includes: sending, by the first entity, an authorization revocation indication message to the API invocation entity. In this way, the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

With reference to the first aspect or any one of the foregoing possible implementations, in a fourth possible implementation of the first aspect, the first entity is an AEF, and the second entity is a CCF corresponding to the API invocation entity; or the first entity is a CCF corresponding to the API invocation entity, and the second entity is an AEF.

With reference to the fourth possible implementation of the first aspect, in a fifth possible implementation of the first aspect, the first entity is a CCF corresponding to the API invocation entity, the second entity is an AEF, and after the revoking, by the first entity, authorization to invoke all APIs on a CCF corresponding to the API invocation entity by the API invocation entity, the method further includes: sending, by the first entity, an authorization revocation notification message to an AEF corresponding to the CCF, where the authorization revocation notification message carries the identifier of the API invocation entity. In this way, the AEF can learn of authorization information of the API invocation entity in a timely manner, thereby avoiding the following case: When the API invocation entity invokes an API with original authorization, the AEF still executes service logic for the API invocation, and consequently processing resources of the AEF are wasted.

According to a second aspect, an authorization revocation method is provided. The method includes: sending, by a second entity, an authorization revocation request message to a first entity, where the authorization revocation request message carries an identifier of an API invocation entity; and receiving, by the second entity, an authorization revocation response message from the first entity, where the authorization revocation response message indicates that authorization revocation succeeds or fails. In the method, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

With reference to the second aspect, in a first possible implementation of the second aspect, the sending, by a second entity, an authorization revocation request message to a first entity includes: sending, by the second entity, the authorization revocation request message to the first entity based on authorization revocation related information of the API invocation entity. A status of the API invocation entity is monitored in real time to implement authorization revocation for the API invocation entity.

With reference to the first possible implementation of the second aspect, in a second possible implementation of the second aspect, the authorization revocation related information includes a quantity of times of API invocation failure, and the sending, by the second entity, the authorization revocation request message to the first entity based on authorization revocation related information of the API invocation entity includes: when the quantity of times of API invocation failure exceeds a threshold, sending the authorization revocation request message to the first entity.

With reference to the second aspect or either of the foregoing possible implementations of the second aspect, in a third possible implementation of the second aspect, the first entity is an AEF, and the second entity is a CCF; or the first entity is a CCF, and the second entity is an AEF.

With reference to the third possible implementation of the second aspect, in a fourth possible implementation of the second aspect, the second entity is an AEF, the first entity is a CCF, and the method further includes: receiving, by the second entity, an API invocation request message from the API invocation entity; and when the API invocation entity has no authorization to invoke an API that the API invocation request message is used to request to invoke, sending, by the second entity, an API invocation reject message to the API invocation entity. The AEF rejects an API invocation request message sent by an API invocation entity that has no authorization, thereby improving processing efficiency of API invocation and saving processing resources of the AEF.

With reference to the third possible implementation of the second aspect, in a fifth possible implementation of the second aspect, the method further includes: sending, by the second entity, an authorization revocation indication message to the API invocation entity. In this way, the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

According to a third aspect, an authorization revocation method is provided. The method includes: obtaining, by an AEF, authorization revocation related information of an API invocation entity, and revoking API invocation authorization of the API invocation entity based on the authorization revocation related information of the API invocation entity. A status of the API invocation entity is monitored in real time to implement authorization revocation for the API invocation entity.

With reference to the third aspect, in a first possible implementation of the third aspect, the method further includes: sending, by the AEF, an authorization revocation notification message to a CCF. In this way, the CCF can learn of authorization information of the API invocation entity in a timely manner, and update authorization of the API invocation entity on the CCF, so that the API invocation entity can execute an authorization process with the CCF again.

With reference to the third aspect or the first possible implementation of the third aspect, in a second possible implementation of the third aspect, the method further includes: sending, by the AEF, an authorization revocation indication message to the API invocation entity. In this way, the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

With reference to the third aspect or either of the possible implementations of the third aspect, in a third possible implementation of the third aspect, the method further includes: obtaining, by the API invocation entity from the CCF, authorization to invoke an API. Before invoking the API, the API invocation entity obtains, from the CCF, the authorization to invoke the API, to ensure security of the API.

According to a fourth aspect, an authorization revocation method is provided. The method includes: receiving, by an AEF, an authorization revocation notification message from a CCF; and updating, by the AEF, API invocation authorization information of an API invocation entity based on the authorization revocation notification message. In this way, the AEF can learn of authorization information of the API invocation entity in a timely manner, thereby avoiding the following case: When the API invocation entity invokes an API with original authorization, the AEF still executes service logic for the API invocation, and consequently processing resources of the AEF are wasted.

According to a fifth aspect, an authorization revocation method is provided. The method includes: receiving, by an API invocation entity, an authorization revocation indication message from a first entity; and updating, by the API invocation entity, API invocation authorization information based on the authorization revocation indication message. In this way, the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, an AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

According to a sixth aspect, an apparatus is provided. The apparatus includes a unit or a means that is configured to perform steps in the method in the first aspect. The apparatus may be a first entity such as an AEF or a CCF, or may be at least one processing element, chip, or system on chip.

According to a seventh aspect, an apparatus is provided. The apparatus includes a unit or a means that is configured to perform steps in the method in the second aspect. The apparatus may be a second entity such as an AEF or a CCF, or may be at least one processing element, chip, or system on chip.

According to an eighth aspect, an apparatus is provided. The apparatus includes a unit or a means that is configured to perform steps in the method in the third aspect. The apparatus may be an AEF, or may be at least one processing element, chip, or system on chip.

According to a ninth aspect, an apparatus is provided. The apparatus includes a unit or a means that is configured to perform steps in the method in the fourth aspect. The apparatus may be an AEF such as an AMF, or may be at least one processing element, chip, or system on chip.

According to a tenth aspect, an apparatus is provided. The apparatus includes a unit or a means that is configured to perform steps in the method in the fifth aspect or the possible designs of the fifth aspect. The apparatus may be an API invocation entity, or may be at least one processing element, chip, or system on chip.

According to an eleventh aspect, an apparatus is provided. The apparatus includes a processor, where the processor is coupled to a memory, the memory is configured to store a program, and the processor invokes the program stored in the memory, to perform the method in the first aspect. The apparatus may be a first entity, or may be at least one processing element or chip.

According to a twelfth aspect, an apparatus is provided. The apparatus includes a processor, where the processor is coupled to a memory, the memory is configured to store a program, and the processor invokes the program stored in the memory, to perform the method in the second aspect. The apparatus may be a second entity, or may be at least one processing element, chip, or system on chip.

According to a thirteenth aspect, an apparatus is provided. The apparatus includes a processor, where the processor is coupled to a memory, the memory is configured to store a program, and the processor invokes the program stored in the memory, to perform the method in the third aspect. The apparatus may be an AEF, or may be at least one processing element, chip, or system on chip.

According to a fourteenth aspect, an apparatus is provided. The apparatus includes a processor, where the processor is coupled to a memory, the memory is configured to store a program, and the processor invokes the program stored in the memory, to perform the method in the fourth aspect. The apparatus may be an AEF, or may be at least one processing element, chip, or system on chip.

According to a fifteenth aspect, an apparatus is provided. The apparatus includes a processor, where the processor is coupled to a memory, the memory is configured to store a program, and the processor invokes the program stored in the memory, to perform the method in the fifth aspect. The apparatus may be an API invocation entity, or may be at least one processing element, chip, or system on chip.

According to a sixteenth aspect, a program is provided, where when being executed by a processor, the program is used to perform any method in the first aspect.

According to a seventeenth aspect, a computer readable storage medium is provided. The storage medium includes the program in the sixteenth aspect.

According to an eighteenth aspect, a program is provided, where when being executed by a processor, the program is used to perform any method in the second aspect.

According to a nineteenth aspect, a computer readable storage medium is provided. The storage medium includes the program in the eighteenth aspect.

According to a twentieth aspect, a program is provided, where when being executed by a processor, the program is used to perform any method in the third aspect.

According to a twenty-first aspect, a computer readable storage medium is provided. The storage medium includes the program in the twentieth aspect.

According to a twenty-second aspect, a program is provided, where when being executed by a processor, the program is used to perform any method in the fourth aspect.

According to a twenty-third aspect, a computer readable storage medium is provided. The storage medium includes the program in the twenty-second aspect.

According to a twenty-fourth aspect, a program is provided, where when being executed by a processor, the program is used to perform any method in the fifth aspect.

According to a twenty-fifth aspect, a computer readable storage medium is provided. The storage medium includes the program in the twenty-fourth aspect.

DESCRIPTION OF EMBODIMENTS

System architectures and service scenarios that are described in this application are intended to describe technical solutions in this application more clearly, but are not intended to limit the technical solutions provided in this application. A person of ordinary skill in the art may know that, as the system architectures evolve and a new service scenario emerges, the technical solutions provided in this application are also applicable to a similar technical problem.

Figure 1:
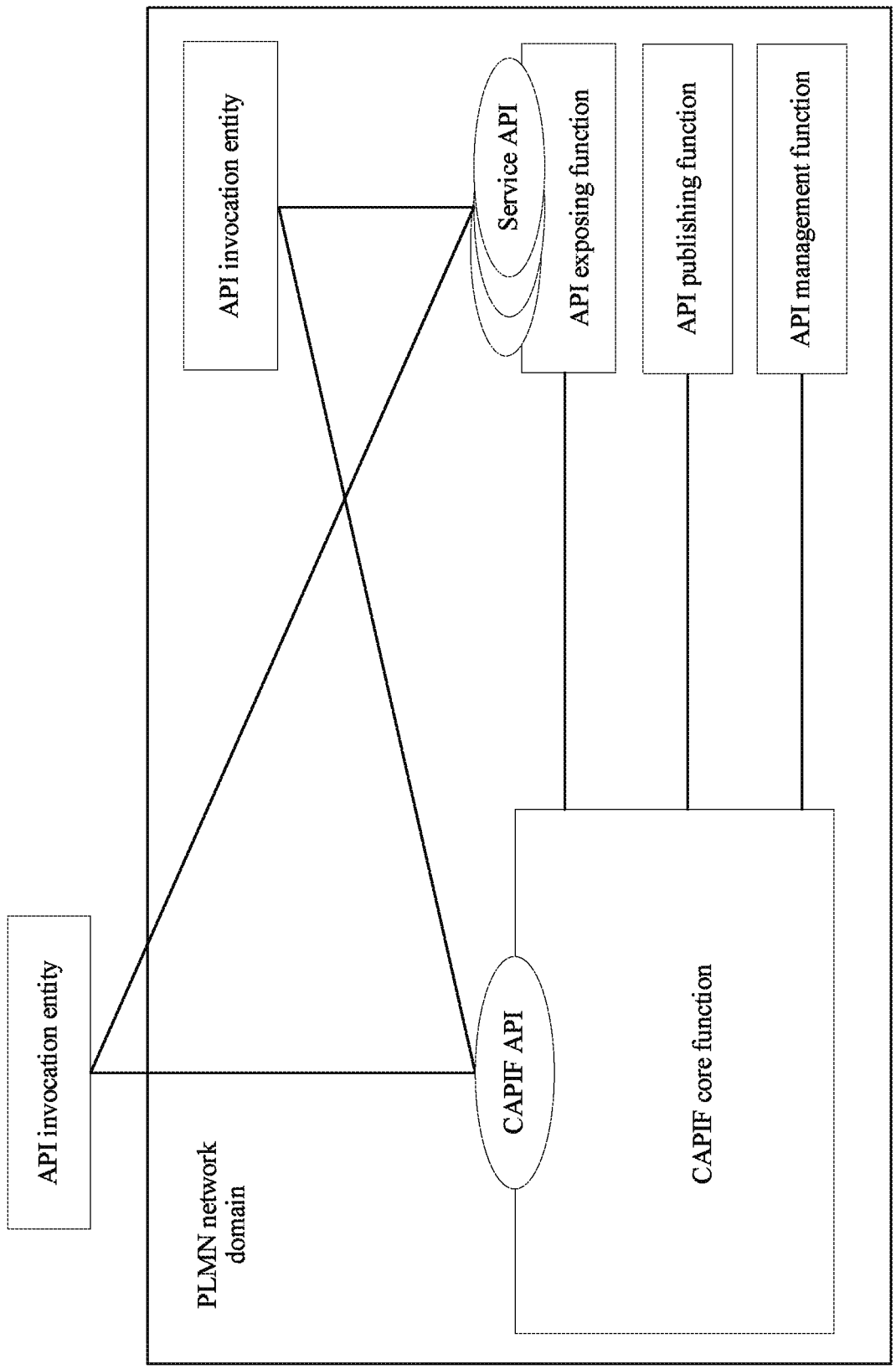
FIG. 1 is a schematic diagram of a common API framework according to an embodiment of this application.

FIG. 1 shows a CAPIF. The network structure may be applied to a 4G or 5G communications system. Apparently, the network structure may alternatively be applied to a communications system of another standard. No limitation is imposed. Components in the CAPIF are briefly described as follows.

An API invocation entity (API invoker) may also be referred to as an API invoker, and is generally a third-party application that signs a service agreement with a public land mobile network (PLMN) operator, for example, a machine-to-machine (M2M) application, an Internet of Things (IoT) application, or a vehicle-to-everything (V2X) application. These applications may run on a terminal device, or may run on a network device. For example, the API invocation entity may be a device in a PLMN, for example, may be a mobility management entity (MME), a radio access network (RAN) node, or a policy and charging rules function (PCRF) that is in a 4G communications system, or may be an access and mobility management function (AMF), a session management function (SMF), a user plane function (UPF), a policy control function (PCF), or an application function (AF) that is in a 5G communications system. The API invocation entity may be used to: implement authentication of the API invocation entity through authentication of an identifier of the API invocation entity and/or other information, obtain authorization to invoke an API before invoking the API, discover the API, invoke the API, and the like.

A CCF may be used to: authenticate the API invocation entity based on the identifier of the API invocation entity and the other information, for example, check whether the API invocation entity is authorized; support mutual authentication with the API invocation entity; provide API invocation authorization information for the API invocation entity before the API invocation entity invokes an API; publish, store, and support API discovery; perform API access control based on a policy of the PLMN operator; store an API invocation log, and provide the log for a function entity that is authorized to obtain the log; perform charging based on the API invocation log; monitor API invocation; register an API invoker; store a configuration policy; support auditing of the invocation and the log, and the like.

An AEF may provide an API, and may also be used as an entry for the API invocation entity to invoke the API. For example, the AEF authenticates the API invocation entity based on the identifier of the API invocation entity and information provided by the CCF, receives authentication information provided by the CCF, and synchronizes an API invocation log to the CCF.

An API publishing function (APF) is used to provide a function of publishing an API, so that the API invocation entity can discover the API.

An API management function (AMF) is used to provide API management, for example, audit an API invocation log provided by the CCF, monitor an event reported by the CCF, configure access and charging policies for the CCF, monitor an API status, and register an API invocation entity.

A CAPIF API is an API provided by the CCF, can be discovered and invoked by the API invocation entity, and mainly includes some common types of APIs, such as an API of a registration type, an API of a security authentication type, and an API of an API discovery type.

A service API is an API exposed by the AEF, can be referred to as an API on the AEF, and can be discovered and invoked by the API invocation entity. The service API mainly includes APIs of some specific service types, and may be used by the API invocation entity to use a resource and a service that are provided by an operator, for example, an API of a QoS control type, an API of a broadcast type, and an API of an IoT type.

In this application, the word such as "example" or "for example" is used to represent giving an example, an illustration, or a description. Any embodiment or design scheme described as an "example" or "for example" in this application should not be construed as being more preferred or having more advantages than another embodiment or design scheme. Exactly, use of the word such as "example" or "for example" is intended to present a related concept in a specific manner. "Of", "corresponding (corresponding or relevant)", and "corresponding" may be interchangeably used sometimes. It should be noted that expressed meanings are consistent when differences are not emphasized. "A and/or B" may mean at least one of A and B.

In this application, if "authorization" appears independently, for example, authorization of the API invocation entity, the authorization may mean authorization to invoke an API by the API invocation entity. No limitation is imposed. All APIs on a CCF may include all APIs (namely, service APIs) on an AEF managed by the CCF, or may include a CAPIF API. No limitation is imposed.

It should be noted that mutual reference may be made to terms and steps in the embodiments of this application. Same descriptions are not repeated. A sequence of performing steps in the embodiments may be interchanged. No limitation is imposed.

Figure 2:
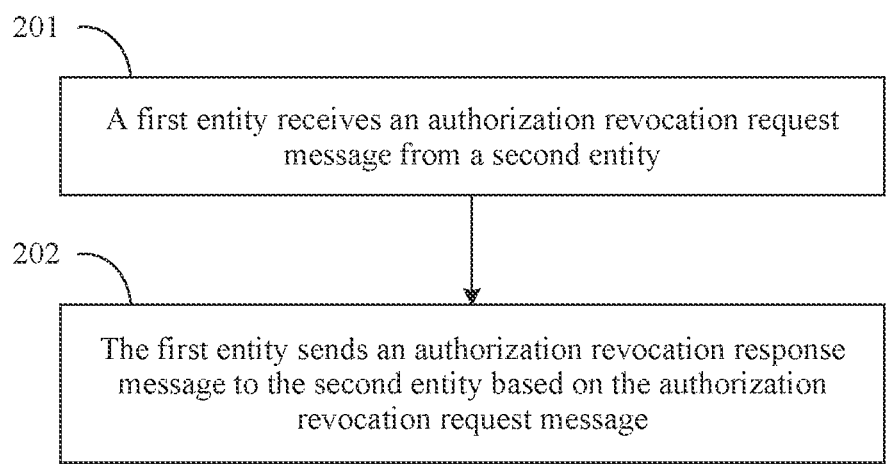
FIG. 2 is a flowchart of an authorization revocation method according to an embodiment of this application.

As shown in FIG. 2, an embodiment of this application provides an authorization revocation method. The method may be applied to the framework shown in FIG. 1, and is specifically described as follows.

201. A first entity receives an authorization revocation request message from a second entity.

The authorization revocation request message may carry an identifier of an API invocation entity. In addition, the authorization revocation request message may be specifically a revoke API invoker authorization request.

The identifier of the API invocation entity may be used to indicate the API invocation entity. Specifically, the identifier may be a name of the API invocation entity, where the name may be a combination of a letter, a number, and a symbol, may be a uniform resource locator (URL), may be a fully qualified domain name (FQDN), or may be an identifier of an application; or the identifier may be an address of the API invocation entity, for example, an IPv4 address and/or an IPv6 address.

Optionally, the authorization revocation request message further carries at least one piece of the following information: an API identifier, an AEF identifier, a specific value, or a revocation cause value.

Specifically, the AEF identifier may be used to indicate an AEF, and may be a name or a number of the AEF, for example, a URL or an FQDN, or may be an address of the AEF, for example, an IPv4 address and/or an IPv6 address.

The API identifier may be used to indicate an API, for example, a name of the API or a number of the API such as 001. No limitation is imposed. An example of the name of the API is as follows:

a product name: Google Calendar API;
a service name: calendar.googleapis.com;
a packet name: google.calendar.v3;
an interface name: google.calendar.v3. CalendarService;
a resource directory: //google/calendar/v3; or
an API name: calendar.

The revocation cause value may be used to indicate an authorization revocation cause. For example, a quantity of times of API invocation rejection is greater than a preset threshold, or a quantity of times of incorrect API invocation is greater than a preset threshold. No limitation is imposed.

In an example, the authorization revocation request message may be used to request to revoke authorization to invoke an API corresponding to an API identifier by the API invocation entity, that is, request to revoke permission to invoke the API corresponding to the API identifier by the API invocation entity. In this case, the authorization revocation request message may carry the API identifier. No limitation is imposed.

In another example, the authorization revocation request message may be used to request to revoke authorization to invoke all APIs on a CCF corresponding to the API invocation entity by the API invocation entity. In this case, the authorization revocation request message may carry a specific value, for example, the specific value is carried at a specific location in the authorization revocation request message; or an API identifier carried in the authorization revocation request message is set to a specific value. Apparently, the authorization revocation request message may carry no API identifier. No limitation is imposed.

In still another example, the authorization revocation request message may be used to request to revoke authorization to invoke all APIs on an AEF by the API invocation entity. In this case, the authorization revocation request message may carry no API identifier, but carries an AEF identifier, and the AEF identifier indicates the AEF. No limitation is imposed.

The first entity may be an AEF, and the second entity may be a CCF; or the first entity is a CCF, and the second entity is an AEF. Specifically, the CCF may be the CCF corresponding to the API invocation entity, for example, a CCF that manages the API invocation entity.

Specifically, the API invocation entity may execute a registration procedure with the CCF, to be registered with a CAPIF system, and the CCF may manage API invocation of the API invocation entity. For example, the CCF receives an API discovery request message sent by the API invocation entity, and provides, for the API invocation entity based on the API discovery request message, an API and information about an AEF on which the API is located. One API invocation entity may be registered with a plurality of CAPIF systems. Generally, the CAPIF system includes only one CCF, and may include a plurality of AEFs, that is, one API invocation entity is corresponding to one CCF. When there are a plurality of CCFs in one CAPIF system, the API invocation entity may be registered with the CAPIF system by using one of the CCFs. In this case, the CCF corresponding to the API invocation entity may be the CCF used by the API invocation entity to perform registration. No limitation is imposed.

202. The first entity sends an authorization revocation response message to the second entity based on the authorization revocation request message.

Optionally, the authorization revocation response message indicates an authorization revocation result. For example, authorization revocation succeeds or fails. The authorization revocation response message may be specifically a revoke API invoker authorization response. Specifically, if the authorization revocation request message is used to request to revoke API invocation authorization of two or more API invocation entities, the authorization revocation response message may include corresponding authorization revocation results. For example, authorization of an API invocation entity 1 is successfully revoked, and authorization of an API invocation entity 2 fails to be revoked. No limitation is imposed.

Optionally, the authorization revocation response message is only used to respond to the authorization revocation request message, to indicate that the first entity has received the authorization revocation request message.

In an example, when the first entity receives the authorization revocation request message, if the first entity is negotiating with the API invocation entity about authorization to invoke the API corresponding to the authorization revocation request message, the first entity may send, to the second entity, the authorization revocation response message used to indicate that authorization revocation fails.

Optionally, the method further includes the following:

203. Revoke API invocation authorization of the API invocation entity based on the authorization revocation request message.

In an example, when the authorization revocation request message further carries an API identifier, the method further includes the following: The first entity revokes authorization to invoke an API corresponding to the API identifier by the API invocation entity. In other words, the foregoing step of revoking API invocation authorization of an API invocation entity based on the authorization revocation request message may be specifically revoking the authorization to invoke the API corresponding to the API identifier by the API invocation entity, or revoking API access permission (or access authorization) of the API invocation entity.

In another example, when the authorization revocation request message further carries an API identifier and an AEF identifier, the method further includes the following: The first entity revokes authorization to invoke, by the API invocation entity, an API that is on an AEF corresponding to the AEF identifier and that is corresponding to the API identifier. In other words, the foregoing step of revoking API invocation authorization of an API invocation entity based on the authorization revocation request message may be specifically revoking the authorization to invoke, by the API invocation entity, the API that is on the AEF corresponding to the AEF identifier and that is corresponding to the API identifier.

In another example, when the authorization revocation request message carries no API identifier, the method further includes the following: The first entity revokes authorization to invoke all APIs on a CCF corresponding to the API invocation entity by the API invocation entity. In other words, the foregoing step of revoking API invocation authorization of an API invocation entity based on the authorization revocation request message may be specifically revoking the authorization to invoke all the APIs on the CCF corresponding to the API invocation entity by the API invocation entity.

In another example, when the authorization revocation request message carries no API identifier and the authorization revocation request message further carries an AEF identifier, the method further includes the following: The first entity revokes authorization to invoke all APIs on an AEF corresponding to the AEF identifier by the API invocation entity. In other words, the foregoing step of revoking API invocation authorization of an API invocation entity based on the authorization revocation request message may be specifically revoking the authorization to invoke all the APIs on the AEF corresponding to the AEF identifier by the API invocation entity.

In still another example, when the authorization revocation request message carries no API identifier and the authorization revocation request message further carries a specific value, or when the authorization revocation request message carries an API identifier and the API identifier is set as a specific value, the method further includes the following: The first entity revokes authorization to invoke all APIs on a CCF corresponding to the API invocation entity by the API invocation entity. In other words, the foregoing step of revoking API invocation authorization of an API invocation entity based on the authorization revocation request message may be specifically revoking the authorization to invoke all the APIs on the CCF corresponding to the API invocation entity by the API invocation entity.

The API corresponding to the API identifier may be the API indicated by the API identifier. The AEF corresponding to the AEF identifier may be an AEF indicated by the AEF identifier.

Revocation may mean that the first entity adds related information of the API invocation entity to a locally stored blacklist, deletes related information of the API invocation entity from a locally stored whitelist, or invalidates related information of the API invocation entity. The blacklist or the whitelist may be used to determine whether the API invocation entity has API invocation authorization, and may be used to determine whether the API invocation entity has API invocation permission.

It should be noted that the revocation mentioned in this application may be replaced with invalidation, withdrawal, or cancellation. The authorization mentioned in this application may mean permission, access authorization, access permission, permission, or access permission. The invocation mentioned in this application may be replaced with access. No limitation is imposed.

In an example, information used to indicate that the API invocation entity has no API invocation authorization or has no API access permission is stored in a form of a blacklist. Referring to Table 1, the blacklist may be based on an API. Alternatively, referring to Table 2, the blacklist may be based on an API invocation entity.

TABLE 1

| Blacklist content | Meaning |
| --- | --- |
| API#1: API invocation entity 1 and API invocation entity 2 | It indicates that neither the API invocation entity 1 nor the API invocation entity 2 has authorization to invoke the API#1. |

TABLE 2

| Blacklist content | Meaning |
| --- | --- |
| API invocation entity 1: API#1 and API#2 | It indicates that the API invocation entity 1 has no authorization to invoke the API#1 and the API#2. |
| API invocation entity 2: All | The API invocation entity 2 has no authorization to invoke any API on the first entity. |
| API invocation entity 3: AEF#1 | The API invocation entity 3 has no authorization to invoke any API on the AEF#1. |

The API #1 may be an API that is numbered 1, API #2 may be an API that is numbered 2, and the AEF #1 may be an AEF that is numbered 1.

In another example, information used to indicate that the API invocation entity has API invocation authorization or the API invocation entity has API access permission is stored in a form of a whitelist. Details are not described.

It should be noted that, step 203 may be performed before step 202, or may be performed after step 202. Apparently, when step 203 is performed, the authorization revocation response message may be used to indicate that authorization revocation succeeds. In addition, when the first entity is a CCF, step 203 may not be performed.

In the method provided in this embodiment, the first entity receives the authorization revocation request message from the second entity, where the authorization revocation request message carries the identifier of the API invocation entity; and the first entity sends the authorization revocation response message to the second entity based on the authorization revocation request message. Therefore, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Optionally, in a first implementation scenario of the foregoing embodiment, the method further includes the following:

The first entity sends an authorization revocation indication message to the API invocation entity.

Optionally, the authorization revocation indication message carries at least one piece of the following information: an API identifier, an AEF identifier, a specific value, or a revocation cause value. The API identifier, the AEF identifier, the specific value, and the revocation cause value may be the same as or different from related content carried in the authorization revocation request message in step 201. No limitation is imposed. For example, the API identifier carried in the authorization revocation indication message may be the same as or different from the API identifier carried in the authorization revocation request message. No limitation is imposed.

The authorization revocation indication message may be used to indicate the following event:

(1) authorization to invoke a specific API by the API invocation entity is revoked; or (2) authorization to invoke all APIs on the AEF by the API invocation entity is revoked; or (3) authorization to invoke all APIs on the CCF by the API invocation entity is revoked.

Specifically, when the authorization revocation indication message indicates the event (1), the authorization revocation indication message may carry an identifier of the specific API. When the authorization revocation indication message indicates the event (2), the authorization revocation indication message may carry an AEF identifier, and the AEF identifier indicates the AEF. When the authorization revocation indication message indicates the event (3), the authorization revocation indication message may carry no API identifier, or may carry a specific value. Details are similar to the authorization revocation request message. For details, refer to related descriptions of the authorization revocation request message. Details are not described again.

In an implementation, the authorization revocation indication message may trigger the API invocation entity to redirect to a procedure in which the API invocation entity requests, from the CCF, newest authorization information for invoking an API (which may be the API mentioned in the revocation indication message)(for example, trigger the API invocation entity to send, to the CCF, a request message used to request API invocation authorization information), or to redirect to a procedure in which the API invocation entity performs security authentication with the CCF, so that the API invocation entity is forced to first obtain the newest API invocation authorization information, or the API invocation entity is forced to perform subsequent API invocation only after determining, through re-authentication, that the API invocation entity is an authorized user.

It may be understood that, the authorization revocation indication message may be used to indicate that the API invocation authorization of the API invocation entity is revoked, so that the API invocation entity can initiate an API invocation procedure based on the newest API invocation authorization information obtained by the API invocation entity. Therefore, API invocation failure caused because an API invocation request message is sent by using invalidated authorization information is avoided, and unnecessary information exchange is reduced, so that resources can be saved and efficiency can be improved.

The authorization revocation indication message may be a revoke API invoker authorization notify (revoke API invoker authorization notify) message.

In an example, the first entity sends the authorization revocation indication message to the API invocation entity after step 203.

In the method provided in the first implementation scenario, the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

Optionally, in a second implementation scenario of the foregoing embodiment, the first entity is a CCF corresponding to the API invocation entity, the second entity is an AEF, and after the first entity revokes the authorization to invoke all the APIs on the CCF corresponding to the API invocation entity by the API invocation entity, the method further includes the following:

The first entity sends an authorization revocation notification message to an AEF corresponding to the CCF.

The authorization revocation notification message may be used to notify that the API invocation authorization of the API invocation entity is revoked, and the authorization revocation notification message may carry the identifier of the API invocation entity.

Further, the authorization revocation notification message may further carry an API identifier and/or an authorization revocation cause value.

In an example, the authorization revocation notification message may be used to notify that authorization to invoke a specific API by the API invocation entity is revoked. In this case, the authorization revocation notification message may further carry an API identifier, and the API identifier indicates the specific API.

In addition, the authorization revocation notification message may be specifically a revoke API invoker authorization notify.

The AEF corresponding to the CCF may be all AEFs managed by the CCF, or may be an AEF other than the second entity in all AEFs managed by the CCF, or may be an AEF that is in an AEF managed by the CCF and that is related to the API invocation entity. To be specific, the API invocation entity obtains, from the CCF by using an API discovery process, at least one API and information about an AEF on which the at least one API is located. For example, the API invocation entity sends an API discovery request message to the CCF, and the CCF provides, for the API invocation entity based on the API discovery request message, an API and information about an AEF on which the API is located. The AEF corresponding to the information about the AEF may be one or more AEFs managed by the CCF, and the AEF corresponding to the information about the AEF may be referred to as the AEF that is in the AEF managed by the CCF and that is related to the API invocation entity. No limitation is imposed.

It should be noted that, the AEF that is in the AEF managed by the CCF and that is related to the API invocation entity may include an AEF on which an API that has been invoked in the at least one API obtained by the API invocation entity in the API discovery process is located, or may include an AEF on which an API that has not been invoked in the API obtained by the API invocation entity in the API discovery process is located. No limitation is imposed.

Correspondingly, the second entity may update the authorization information of the API invocation entity based on the authorization revocation notification message.

Specifically, if the second entity has not stored the authorization of the API invocation entity, the second entity stores the authorization information of the API invocation entity, so that the AEF performs an appropriate operation on API invocation of the API invocation entity based on newest authorization information of the API invocation entity that is obtained by the AEF. For example, when authorization to invoke a specific API by the API invocation entity is revoked, the AEF may directly reject a request of the API invocation entity to invoke the specific API.

In the method provided in the second implementation scenario, the AEF can learn of authorization information of the API invocation entity in a timely manner, thereby avoiding the following case: When the API invocation entity invokes an API with original authorization, the AEF still executes service logic for the API invocation, and consequently processing resources of the AEF are wasted.

It should be noted that the first implementation scenario and the second implementation scenario may be combined. No limitation is imposed.

Figure 3:
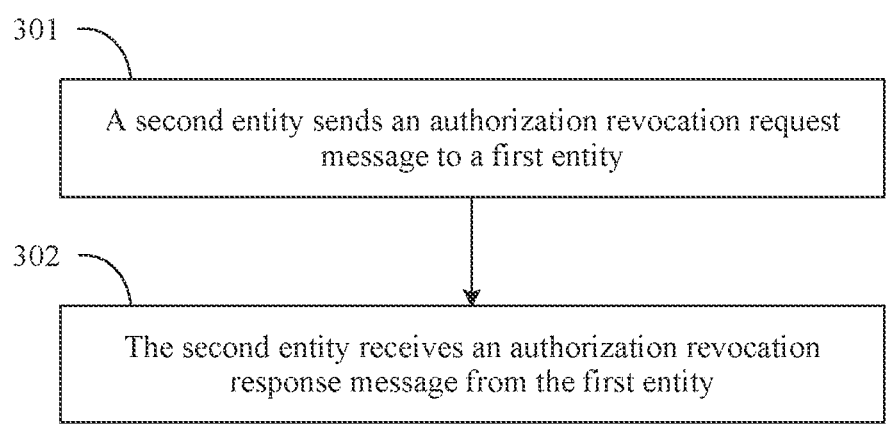
FIG. 3 is a flowchart of another authorization revocation method according to an embodiment of this application.

As shown in FIG. 3, an embodiment of this application provides another authorization revocation method. The method may be applied to the framework shown in FIG. 1, and is specifically described as follows.

301. A second entity sends an authorization revocation request message to a first entity.

The authorization revocation request message may carry an identifier of an API invocation entity.

The first entity may be an AEF, and the second entity may be a CCF; or the first entity may be a CCF, and the second entity may be an AEF. Specifically, the CCF may be a CCF corresponding to the API invocation entity. For details, refer to related descriptions in the embodiment shown in FIG. 2. Details are not described again.

302. The second entity receives an authorization revocation response message from the first entity.

For the authorization revocation response message, refer to related descriptions in the embodiment shown in FIG. 2. For example, the authorization revocation response message may be used to indicate that authorization revocation succeeds or fails.

Optionally, step 301 includes the following: The second entity sends the authorization revocation request message to the first entity based on authorization revocation related information of the API invocation entity. A status of the API invocation entity is monitored in real time to implement authorization revocation for the API invocation entity.

In an example, when the authorization revocation related information meets a preset condition, the second entity sends the authorization revocation request message to the first entity.

The authorization revocation related information may include at least one piece of the following information: a quantity of times of API invocation rejection, a quantity of times of incorrect API invocation, or a quantity of times of API invocation success. Specifically, the quantity of times of API invocation rejection may be a quantity of times that invoking of an API by the API invocation entity is rejected, namely, a quantity of times that invoking of an API is rejected; or may be a quantity of times that invoking of all APIs by the API invocation entity is rejected within a preset time period. The quantity of times of incorrect API invocation may be a quantity of times that the API invocation entity incorrectly invokes an API, namely, a quantity of times that an API is incorrectly invoked; or may be a quantity of times that the API invocation entity incorrectly invokes all APIs within a preset time period. No limitation is imposed.

Incorrect API invocation may mean invoking an API by using an improper parameter. For example, an input parameter of the API is of a string type, and when the API invocation entity invokes the API, the input parameter value is a number. For another example, the API has three input parameters, and when the API invocation entity invokes the API, there are more than three input parameters.

In an example, the authorization revocation related information includes the quantity of times of API invocation failure. When the quantity of times of API invocation failure exceeds a threshold, the second entity sends the authorization revocation request message to the first entity.

In another example, if a sum of the quantity of times of API invocation failure and the quantity of times of incorrect API invocation exceeds a threshold, the second entity sends the authorization revocation request message to the first entity.

In still another example, if the quantity of times of API invocation success reaches an upper limit or the quantity of times of API invocation success reaches an upper limit within a preset time period, the second entity sends the authorization revocation request message to the first entity.

Optionally, the authorization revocation request message further carries at least one piece of the following information: an API identifier, an AEF identifier, a specific value, or a revocation cause value. For details, refer to related descriptions in the embodiment shown in FIG. 2. Details are not described again.

In the method provided in this embodiment, the second entity sends the authorization revocation request message to the first entity, where the authorization revocation request message carries the identifier of the API invocation entity; and the second entity receives the authorization revocation response message from the first entity, where the authorization revocation response message indicates that authorization revocation succeeds or fails. In the method, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Optionally, in a first implementation scenario of the foregoing embodiment, the second entity is an AEF, the first entity is a CCF, and the method further includes the following:

The second entity receives an API invocation request message from the API invocation entity; and the second entity rejects the API invocation request message based on the API invocation request message.

The API invocation request message may carry an API identifier corresponding to an API that the API invocation entity requests to invoke.

That the second entity rejects the API invocation request message based on the API invocation request message may include the following:

When the API invocation entity has no authorization to invoke the API that the API invocation request message is used to request to invoke, the second entity rejects the API invocation request message.

Specifically, that the second entity rejects the API invocation request message may include the following: The second entity sends an API invocation reject message to the API invocation entity, or sends no response message to the API invocation entity, or the like. No limitation is imposed.

In an example, the API invocation request message requests to invoke an API #1. However, the AEF finds that the API invocation entity has no authorization to invoke the API #1, in other words, the API invocation entity has no permission to access the API #1. In this case, the AEF may directly send an API invocation reject message to the API invocation entity, to reject the API invocation request message sent by the API invocation entity.

Specifically, the AEF may locally store a blacklist or a whitelist, that is, there is a blacklist or a whitelist for each API. For example, when the AEF determines that the blacklist includes the identifier of the API invocation entity, the AEF rejects the API invocation request message sent by the API invocation entity.

Both the blacklist and the whitelist may be indexed by an API, for example, an API #1: an API invoker 1 and an API invoker 2; or may be indexed by an API invocation entity, for example, an API invoker 1: an API #1 and an API #3. For details, refer to related descriptions in the embodiment shown in FIG. 2. Details are not described again.

In the first implementation scenario, the AEF rejects an API invocation request message sent by an API invocation entity that has no authorization, thereby improving processing efficiency of API invocation and saving processing resources of the AEF.

Optionally, in a second implementation scenario of the foregoing embodiment, the method further includes the following:

The second entity sends an authorization revocation indication message to the API invocation entity.

For the authorization revocation indication message, refer to related descriptions in the embodiment shown in FIG. 2. Details are not described again.

In an example, the second entity sends the authorization revocation indication message to the API invocation entity based on the authorization revocation response message. For example, when the authorization revocation response message indicates that authorization of the API invocation entity is successfully revoked, the second entity sends the authorization revocation indication message to the API invocation entity. When the authorization revocation response message indicates that authorization of the API invocation entity fails to be revoked, the second entity does not send the authorization revocation indication message to the API invocation entity.

In another example, the second entity sends the authorization revocation indication message to the API invocation entity based on an authorization revocation notification message. For example, if the authorization revocation response message is only used to respond to the authorization revocation request message, that is, used to indicate that the first entity has received the authorization revocation request message, the second entity may receive the authorization revocation notification message sent by the first entity (refer to a third implementation scenario in this embodiment), and then send the authorization revocation indication message to the API invocation entity based on the authorization revocation notification message.

The authorization revocation indication message is sent to the API invocation entity, so that the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

Optionally, in a third implementation scenario of the foregoing embodiment, the second entity is an AEF, the first entity is a CCF, and the method further includes the following:

The second entity receives an authorization revocation notification message from the first entity, and updates authorization information of the API invocation entity based on the authorization revocation notification message.

Specifically, if the second entity has not stored the authorization of the API invocation entity, the second entity stores the authorization information of the API invocation entity, for example, stores the authorization information in a blacklist or a whitelist, so that the AEF performs an appropriate operation on API invocation of the API invocation entity based on newest authorization information of the API invocation entity that is obtained by the AEF. For example, when authorization to invoke a specific API by the API invocation entity is revoked, the AEF may directly reject a request of the API invocation entity to invoke the specific API.

The first entity sends the authorization revocation notification message to the second entity, so that the second entity can update the authorization information of the API invocation entity in a timely manner. For example, when the second entity is an AEF, the AEF can learn of the authorization information of the API invocation entity in a timely manner, thereby avoiding the following case: When the API invocation entity invokes an API with original authorization, the AEF still executes service logic for the API invocation, and consequently processing resources of the AEF are wasted. For another example, when the second entity is a CCF, the CCF may update, based on the authorization revocation notification message in a timely manner, the authorization information of the API invocation entity that is stored in the CCF, thereby avoiding problems such as low efficiency and resource waste caused when the API invocation entity cannot obtain newest authorization information when obtaining API invocation authorization from the CCF.

It should be noted that, two of the foregoing implementation scenarios may be combined, or three of the foregoing implementation scenarios may be combined. No limitation is imposed.

Figure 4:
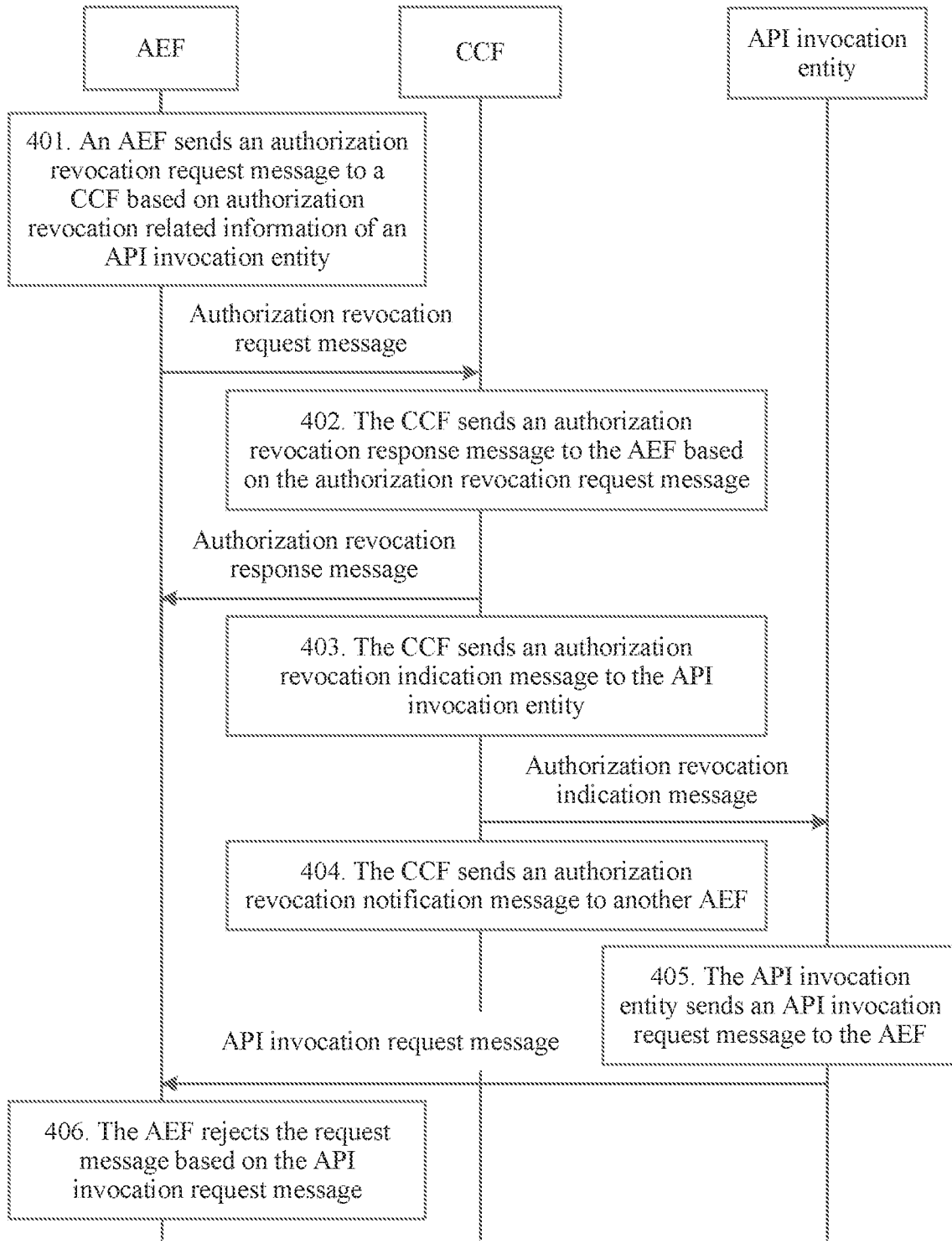
FIG. 4 is a flowchart of another authorization revocation method according to an embodiment of this application.

As shown in FIG. 4, an embodiment of this application provides still another authorization revocation method. The method may be applied to the framework shown in FIG. 1, and is specifically described as follows.

401. An AEF sends an authorization revocation request message to a CCF based on authorization revocation related information of an API invocation entity.

The authorization revocation request message may carry an identifier of the API invocation entity. For details, refer to related descriptions in the foregoing embodiments. Details are not described again.

For the authorization revocation related information, refer to related descriptions in the embodiment shown in FIG. 3. Details are not described again.

Specifically, step 401 may include the following: When the authorization revocation related information meets a preset condition, the AEF sends the authorization revocation request message to the CCF.

In an example, when a quantity, of the API invocation entity, of times of API invocation rejection exceeds a preset threshold, the AEF sends the authorization revocation request message to the CCF, where the authorization revocation request message carries the identifier of the API invocation entity. The threshold may be preconfigured on the AEF, or may be configured by the CCF for the AEF. The quantity of times of API invocation rejection may be a quantity of times that invoking of a specific API is rejected, or may not be limited.

In another example, when a quantity, of the API invocation entity, of times of incorrect API invocation exceeds a preset threshold, the AEF sends the authorization revocation request message to the CCF, where the authorization revocation request message carries the identifier of the API invocation entity. The threshold may be preconfigured on the AEF, or may be configured by the CCF for the AEF. The quantity of times of incorrect API invocation may be a quantity of times that a specific API is incorrectly invoked, or may not be limited.

In still another example, when a quantity, of the API invocation entity, of times of incorrect API invocation exceeds a first threshold and a quantity, of the API invocation entity, of times of API invocation rejection exceeds a second threshold, the AEF sends the authorization revocation request message to the CCF, where the authorization revocation request message carries the identifier of the API invocation entity. Similarly, the quantity of times of incorrect API invocation may be a quantity of times that a specific API is incorrectly invoked, or may not be limited.

The authorization revocation request message may carry at least one piece of the following information: an API identifier, an AEF identifier, a specific value, or a revocation cause value. The AEF identifier may be used to indicate the AEF in step 401. For details, refer to related descriptions in the embodiment shown in FIG. 2. Details are not described again.

402. The CCF sends an authorization revocation response message to the AEF based on the authorization revocation request message.

For the authorization revocation response message, refer to related descriptions in the embodiment shown in FIG. 2. For example, the authorization revocation response message may be used to indicate an authorization revocation result, that is, indicate that authorization revocation succeeds or fails.

In an example, when the CCF receives the authorization revocation request message sent by the AEF, where the authorization revocation request message is used to request to revoke authorization to invoke a specific API, if the CCF has already negotiated with the API invocation entity about the authorization to invoke the specific API, the CCF sends, to the AEF, the authorization revocation response message used to indicate that authorization revocation fails.

Correspondingly, the AEF receives the authorization revocation response message. Further, the AEF may update API invocation authorization information of the API invocation entity based on the authorization revocation response message.

403. The CCF sends an authorization revocation indication message to the API invocation entity.

The authorization revocation indication message may be used to indicate the following event:

(1) authorization to invoke a specific API by the API invocation entity is revoked; or (2) authorization to invoke all APIs on the AEF by the API invocation entity is revoked; or (3) authorization to invoke all APIs on the CCF by the API invocation entity is revoked.

Optionally, the authorization revocation indication message carries at least one piece of the following information: an API identifier, an AEF identifier, a specific value, or a revocation cause value.

Specifically, when the authorization revocation indication message indicates the event (1), the authorization revocation indication message may carry an identifier of the specific API. When the authorization revocation indication message indicates the event (2), the authorization revocation indication message may carry an AEF identifier, and the AEF identifier indicates the AEF. When the authorization revocation indication message indicates the event (3), the authorization revocation indication message may carry no API identifier, or may carry a specific value. Details are similar to the authorization revocation request message. For details, refer to related descriptions of the authorization revocation request message. Details are not described again.

Correspondingly, the API invocation entity receives the authorization revocation indication message. Further, the API invocation entity may update the API invocation authorization information based on the authorization revocation indication message.

It should be noted that steps 403 to 406 are all optional steps.

Optionally, for the case in which the authorization to invoke all the APIs on the CCF by the API invocation entity is revoked, step 404 is performed.

404. The CCF sends an authorization revocation notification message to another AEF.

The authorization revocation notification message may be used to notify another AEF that the API invocation authorization of the API invocation entity is revoked, so that another AEF can also directly reject an API invocation request of the API invocation entity, to reduce system resource waste caused by API invocation failure.

The authorization revocation notification message may carry the identifier of the API invocation entity, or may carry an API identifier and/or an authorization revocation cause value. For details, refer to related descriptions in the embodiment shown in FIG. 2. Details are not described again.

The another AEF may be an AEF other than the AEF in step 401 in an AEF managed by the CCF, or may be an AEF that is other than the AEF in step 401 in an AEF managed by the CCF and that is related to the API invocation entity. For details, refer to related descriptions in the embodiment shown in FIG. 2. Details are not described again.

Correspondingly, another AEF receives the authorization revocation notification message. Further, another AEF may update the API invocation authorization information of the API invocation entity based on the authorization revocation notification message.

405. The API invocation entity sends an API invocation request message to the AEF.

The API invocation request message may carry an API identifier corresponding to an API that the API invocation entity requests to invoke.

Specifically, the API invocation entity may send the API invocation request message to the AEF based on the API invocation authorization information stored in the API invocation entity. No limitation is imposed.

406. The AEF rejects the request message based on the API invocation request message.

The rejecting the request may be sending a reject message to the API invocation entity, or may be sending no response message to the API invocation entity. No limitation is imposed.

For step 406, refer to related descriptions in the embodiment shown in FIG. 3. Details are not described again.

Optionally, before step 403, the method further includes the following. The CCF revokes the API invocation authorization of the API invocation entity based on the authorization revocation request message. For details, refer to related descriptions in step 203. Details are not described.

In the method provided in this embodiment, the AEF sends the authorization revocation request message to the CCF, where the authorization revocation request message carries the identifier of the API invocation entity; and the AEF receives the authorization revocation response message from the CCF, where the authorization revocation response message indicates that authorization revocation succeeds or fails. In the method, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and the AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Figure 5:
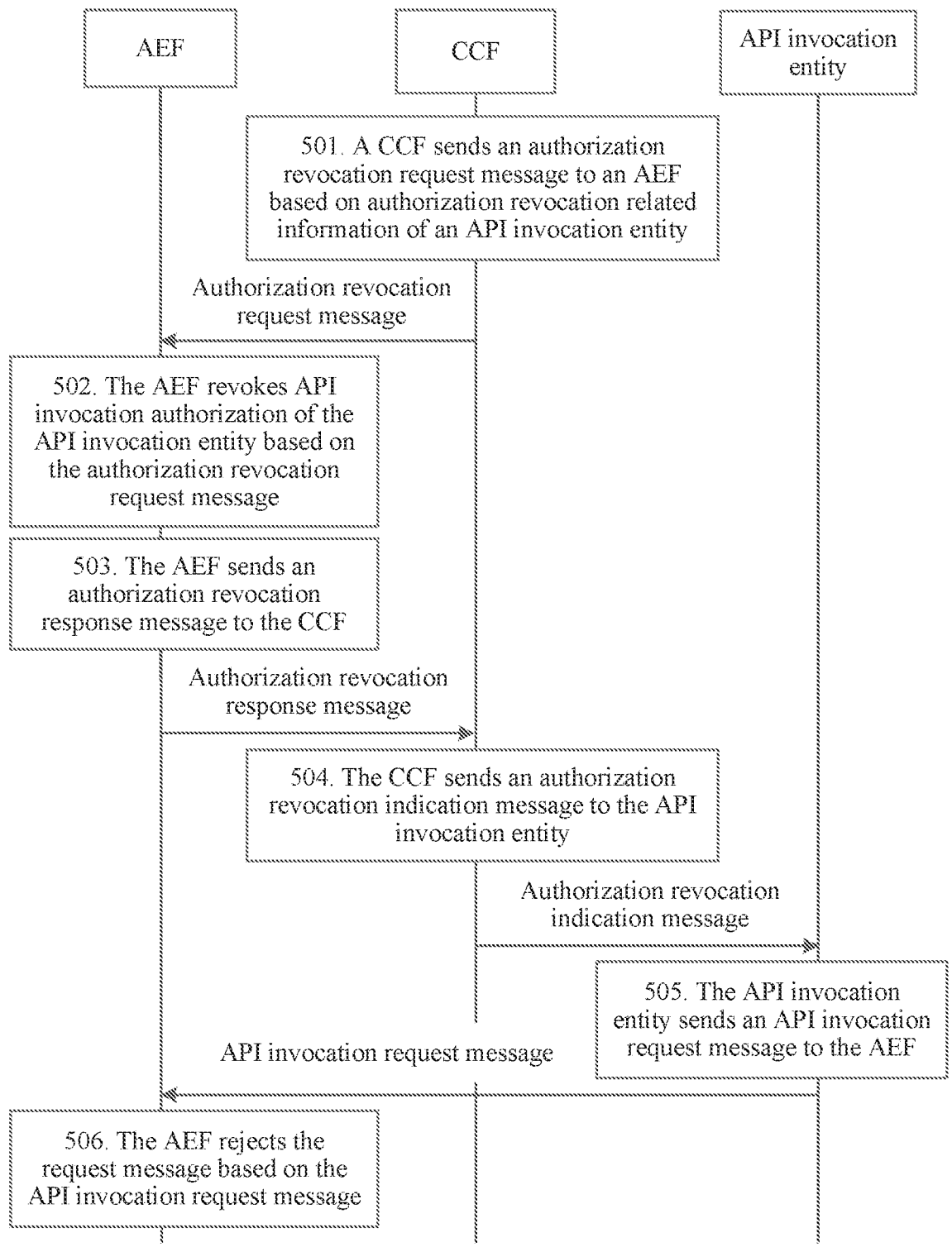
FIG. 5 is a flowchart of another authorization revocation method according to an embodiment of this application.

As shown in FIG. 5, an embodiment of this application provides still another authorization revocation method. The method may be applied to the framework shown in FIG. 1, and is specifically described as follows.

501. A CCF sends an authorization revocation request message to an AEF based on authorization revocation related information of an API invocation entity.

The authorization revocation request message may carry an identifier of the API invocation entity. For details, refer to related descriptions in the embodiment shown in FIG. 2. Details are not described again.

For the authorization revocation related information and for how to send the authorization revocation request message based on the authorization revocation related information of the API invocation entity, refer to related descriptions in the foregoing method embodiments. Details are not described again.

Optionally, before step 501, the method further includes the following: The CCF receives API invocation information reported by the AEF, for example, a total quantity of times of API invocation, a quantity of times of API invocation failure, or a quantity of times of API invocation success, where the API invocation information may be used to obtain the authorization revocation related information; or the CCF receives the authorization revocation related information reported by the AEF.

In an example, when an exception occurs in API invocation, for example, the API invocation entity incorrectly invokes an API, the AEF reports the error information to the CCF. In this manner, the CCF may obtain an API invocation status of the API invocation entity in an entire system managed by the CCF, so that API invocation authorization of the API invocation entity is revoked based on the API invocation status.

502. The AEF revokes API invocation authorization of the API invocation entity based on the authorization revocation request message.

In step 502, the revoking API invocation authorization of the API invocation entity may be as follows:

revoking authorization to invoke a specific API by the API invocation entity; or revoking authorization to invoke all APIs on the AEF by the API invocation entity.

In an example, the authorization revocation request message further carries an API identifier, and the AEF revokes authorization to invoke an API corresponding to the API identifier by the API invocation entity.

In another example, the authorization revocation request message further carries an API identifier and an AEF identifier used to indicate the AEF in step 502, and the AEF revokes authorization to invoke, by the API invocation entity, an API that is corresponding to the API identifier and that is on the AEF.

In still another example, when the authorization revocation request message carries no API identifier, or when the authorization revocation request message carries no API identifier but carries an AEF identifier used to indicate the AEF in step 502, or when the authorization revocation request message further carries a specific value, the AEF revokes the authorization to invoke all the APIs on the AEF by the API invocation entity.

It should be noted that, the foregoing revocation may be specifically implemented by adding a related record of the API invocation entity to a blacklist locally stored in the AEF or deleting a related record of the API invocation entity from a whitelist locally stored in the AEF. For details, refer to related descriptions in the embodiment shown in FIG. 2. No limitation is imposed.

503. The AEF sends an authorization revocation response message to the CCF.

The authorization revocation response message may include an authorization revocation result. For details, refer to related descriptions in the embodiment shown in FIG. 2. For example, the authorization revocation response message indicates that authorization revocation succeeds or fails.

In an example, if use of the API that is indicated by the API identifier and that is on the AEF stops (for example, the API does not exist, or the API has been decommissioned), the AEF returns, to the CCF, the revocation response message indicating that authorization revocation fails.

504. The CCF sends an authorization revocation indication message to the API invocation entity.

Correspondingly, the API invocation entity receives the authorization revocation indication message. Further, the API invocation entity may update the API invocation authorization information based on the authorization revocation indication message.

For step 504, refer to related descriptions in step 403. In addition, step 504 may be replaced with a step that the AEF sends an authorization revocation indication message to the API invocation entity. No limitation is imposed.

It should be noted that steps 504 to 506 are optional steps. Specifically, steps 505 and 506 may be performed when step 504 is not performed. No limitation is imposed.

505. The API invocation entity sends an API invocation request message to the AEF.

The API invocation request message may carry an API identifier corresponding to an API that the API invocation entity requests to invoke.

506. The AEF rejects the request message based on the API invocation request message.

The rejecting the request may be sending a reject message to the API invocation entity, or may be sending no response message to the API invocation entity. No limitation is imposed.

For step 506, refer to related descriptions in the embodiment shown in FIG. 3. Details are not described again.

In the method provided in this embodiment, the CCF sends the authorization revocation request message to the AEF, where the authorization revocation request message carries the identifier of the API invocation entity; and the AEF sends the authorization revocation response message to the CCF, where the authorization revocation response message indicates that authorization revocation succeeds or fails. In the method, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and the AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Figure 6:
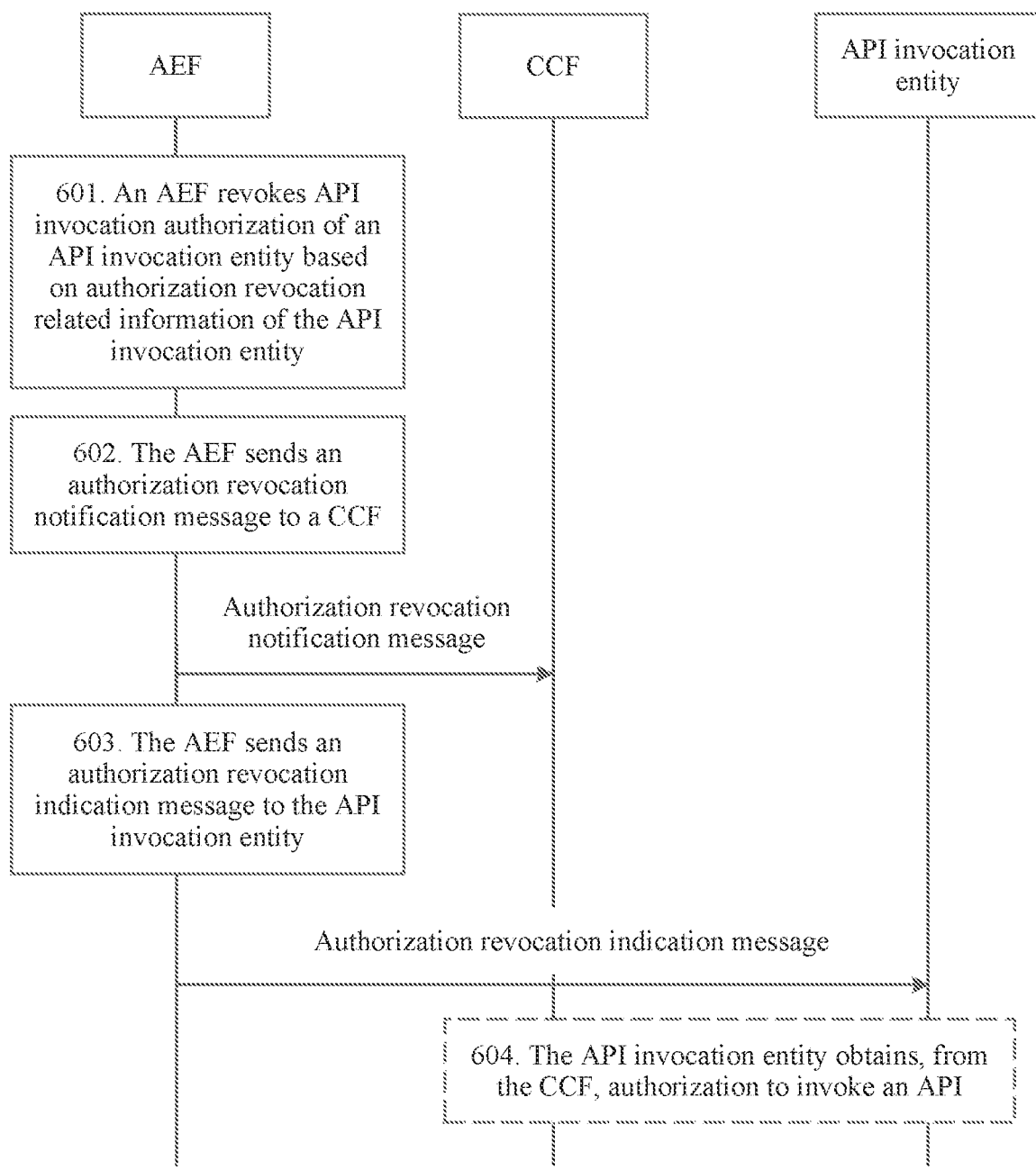
FIG. 6 is a flowchart of another authorization revocation method according to an embodiment of this application.

As shown in FIG. 6, an embodiment of this application provides still another authorization revocation method. The method may be applied to the framework shown in FIG. 1, and is specifically described as follows.

601. An AEF revokes API invocation authorization of an API invocation entity based on authorization revocation related information of the API invocation entity.

Specifically, step 601 may include the following: When the authorization revocation related information meets a preset condition, the AEF revokes the API invocation authorization of the API invocation entity.

For the authorization revocation related information, the revocation, and the like, refer to related descriptions in the foregoing embodiments. Details are not described again.

602. The AEF sends an authorization revocation notification message to a CCF.

The authorization revocation notification message may be used to indicate the following event:

(1) authorization to invoke a specific API by the API invocation entity is revoked; or (2) authorization to invoke all APIs on the AEF by the API invocation entity is revoked.

Optionally, the authorization revocation notification message carries at least one piece of the following information: an API identifier, an AEF identifier, a specific value, or a revocation cause value.

Specifically, when the authorization revocation notification message indicates the event (1), the authorization revocation notification message may carry an identifier of the specific API; or when the authorization revocation notification message indicates the event (2), the authorization revocation notification message may carry an AEF identifier, and the AEF identifier indicates the AEF; or the authorization revocation notification message carries a specific value; or the authorization revocation notification message carries a specific value and an AEF identifier, where a combination of the specific value and the AEF identifier is used to notify that the authorization to invoke all the APIs on the AEF by the API invocation entity is revoked.

The authorization revocation notification message may trigger the CCF to execute an authorization request procedure with another AEF that has an API invocation relationship with the API invocation entity, to implement API invocation authorization management of the API invocation entity together. The authorization revocation notification message may be specifically a revoke API invoker authorization notify message.

603. The AEF sends an authorization revocation indication message to the API invocation entity.

Correspondingly, the API invocation entity receives the authorization revocation indication message. Further, the API invocation entity may update the API invocation authorization information based on the authorization revocation indication message. In an implementation, the authorization revocation indication message may trigger the API invocation entity to redirect to a page on which the API invocation entity requests new API invocation authorization from the CCF, or to redirect to a page on which the API invocation entity performs security authentication with the CCF, so that the API invocation entity is forced to first obtain newest API invocation authorization information, or the API is forced to perform subsequent API invocation only after determining, through re-authentication, that the API invocation entity is an authorized user.

Optionally, the authorization revocation indication message carries at least one piece of the following information: an API identifier, an AEF identifier, a specific value, or a revocation cause value.

The authorization revocation indication message may be used to indicate the following event:

(1) authorization to invoke a specific API by the API invocation entity is revoked; or (2) the authorization to invoke all the APIs on the AEF by the API invocation entity is revoked.

Specifically, when the authorization revocation indication message indicates the event (1), the authorization revocation indication message may carry an identifier of the specific API; or when the authorization revocation indication message indicates the event (2), the authorization revocation indication message may carry an AEF identifier, and the AEF identifier indicates the AEF; or the authorization revocation indication message carries a specific value; or the authorization revocation indication message carries a specific value and an AEF identifier, where a combination of the specific value and the AEF identifier indicates that the authorization to invoke all the APIs on the AEF by the API invocation entity is revoked.

The AEF sends the authorization revocation indication message to the API invocation entity, to indicate that the API invocation authorization of the API invocation entity is revoked, so that the API invocation entity can initiate an API invocation procedure based on new API invocation authorization information obtained by the API invocation entity. Therefore, invocation rejection or invocation failure that is caused because an API invocation request is initiated by using invalidated authorization information is avoided, and unnecessary information exchange is avoided, so that resources can be saved and efficiency can be improved.

The authorization revocation indication message may be specifically a revoke API invoker authorization notify message.

Alternatively, step 603 may be as follows: The CCF sends an authorization revocation indication message to the API invocation entity. For example, after receiving the authorization revocation notification message, the CCF sends the authorization revocation indication message to the API invocation entity. In addition, optionally, before step 601, the method may further include the following: The AEF obtains the authorization revocation related information of the API invocation entity.

It should be noted that both step 602 and step 603 are optional steps. Both the two steps may be performed, or only one of the two steps may be performed, or neither of the two steps may be performed. No limitation is imposed.

Optionally, the method further includes the following:

604. The API invocation entity obtains, from the CCF, authorization to invoke an API.

The API in step 604 may be the same as the API in the foregoing steps, for example, the API is the same as the API in the foregoing steps or is partially the same as the API in the foregoing steps; or the API may be different from the API in the foregoing steps. No limitation is imposed.

6041. The API invocation entity sends an obtain API authorization request message.

The obtain API authorization request message is used to obtain the authorization to invoke the API. The message may include an identifier of the API invocation entity. Optionally, the message further includes an identifier of the API.

6042. The CCF authenticates the API invocation entity.

Specifically, step 6042 may include the following: The CCF checks whether a user has permission to invoke the requested API; and if the user has permission to invoke the requested API, the authentication succeeds.

6043. The CCF sends, to the API invocation entity based on subscription information of the API invocation entity, information about the authorization to invoke the API.

In an example, based on the subscription information of the API invocation entity, for example, the identifier of the API invocation entity and time, the CCF may generate a random string or a token or update a locally maintained mapping relationship table between an API invocation entity and API invocation. Then, the CCF sends, to the API invocation entity, the information about the authorization to invoke the API.

The information about the authorization to invoke the API may be used to indicate that the API invocation entity has permission to invoke or access the API, and may be specifically the random string or the token that is generated by the CCF and sent to the API invocation entity, or the mapping relationship table that is between an API invocation entity and an API and that is locally maintained on the CCF.

In the method provided in this embodiment, the AEF revokes the API invocation authorization of the API invocation entity based on the authorization revocation related information of the API invocation entity, and sends the authorization revocation notification message to the CCF. Therefore, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and the AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Figure 7:
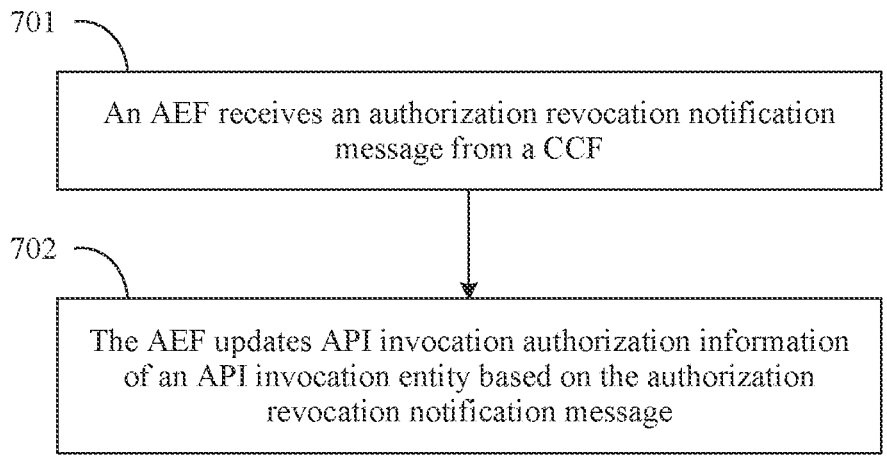
FIG. 7 is a flowchart of another authorization revocation method according to an embodiment of this application.

As shown in FIG. 7, an embodiment of this application provides still another authorization revocation method. The method may be applied to the framework shown in FIG. 1, and is specifically described as follows.

701. An AEF receives an authorization revocation notification message from a CCF.

The authorization revocation notification message carries an identifier of an API invocation entity. For details, refer to related descriptions in the foregoing embodiments. Details are not described again.

702. The AEF updates API invocation authorization information of an API invocation entity based on the authorization revocation notification message.

In an example, the authorization revocation notification message carries the identifier of the API invocation entity, and the AEF may update authorization information of all APIs related to the API invocation entity. For example, the AEF records that the API invocation entity has no permission to invoke any API, and this may be specifically implemented by updating a blacklist or a whitelist. No limitation is imposed.

In another example, the authorization revocation notification message carries the identifier of the API invocation entity and an API identifier, and the AEF may update authorization information of an API corresponding to the API identifier. For example, if a blacklist is based on an API, the identifier of the API invocation entity may be added to related content of the API corresponding to the API identifier in the blacklist. No limitation is imposed.

In the method provided in this embodiment, the AEF receives the authorization revocation notification message from the CCF, and updates the API invocation authorization information of the API invocation entity based on the authorization revocation notification message, so that the AEF can learn of authorization information of the API invocation entity in a timely manner, thereby avoiding the following case: When the API invocation entity invokes an API with original authorization, the AEF still executes service logic for the API invocation, and consequently processing resources of the AEF are wasted.

Figure 8:
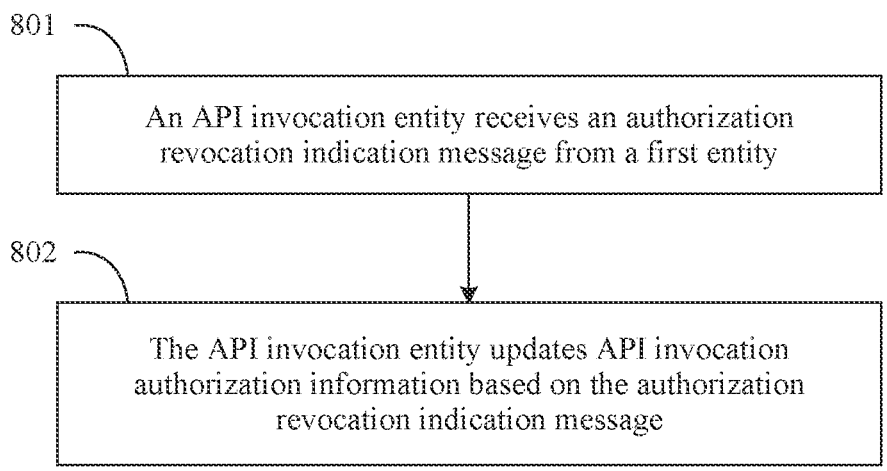
FIG. 8 is a flowchart of another authorization revocation method according to an embodiment of this application.

As shown in FIG. 8, an embodiment of this application provides still another authorization revocation method. The method may be applied to the framework shown in FIG. 1, and is specifically described as follows.

801. An API invocation entity receives an authorization revocation indication message from a first entity.

The first entity may be an AEF or a CCF. No limitation is imposed.

In addition, for the authorization revocation indication message, refer to related descriptions in the foregoing embodiments. Details are not described again.

802. The API invocation entity updates API invocation authorization information based on the authorization revocation indication message.

In an example, the API invocation entity may record the API invocation authorization information based on the authorization revocation indication message.

Further, the method may further include the following:

803. The API invocation entity sends an API invocation request message to an AEF based on the locally stored API invocation authorization information.

For the API invocation request message, refer to related descriptions in the foregoing embodiments. Details are not described again.

It should be noted that "record" mentioned in this application may be replaced with "store". In addition, when an execution body of the foregoing update action does not store the related information that needs to be updated, "update" may be replaced with "store". No limitation is imposed.

In the method provided in this embodiment, the API invocation entity receives the authorization revocation indication message from the first entity, and updates the API invocation authorization information based on the authorization revocation indication message, so that the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, the AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

Figure 9:
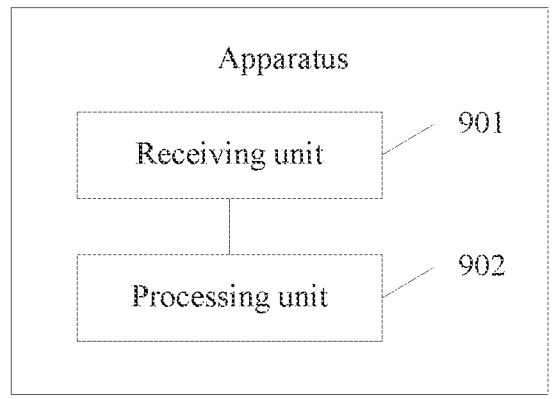
FIG. 9 is a schematic structural diagram of an apparatus according to an embodiment of this application.

As shown in FIG. 9, an embodiment of this application provides an apparatus. The apparatus may be a first entity, or may be located in the first entity, for example, may be one or more chips or systems on chip. The apparatus may be configured to perform an action of the first entity in the embodiment shown in FIG. 2, or may be configured to perform an action of the CCF in the embodiment shown in FIG. 4, or may be configured to perform an action of the AEF in the embodiment shown in FIG. 5. No limitation is imposed.

The apparatus may specifically include a receiving unit 901 and a processing unit 902. Details are as follows:

The receiving unit 901 is configured to receive authorization revocation request message from a second entity, where the authorization revocation request message carries an identifier of an API invocation entity.

The processing unit 902 is configured to send an authorization revocation response message to the second entity based on the authorization revocation request message received by the receiving unit 901.

The authorization revocation request message may further carry at least one piece of the following information: an API identifier, an AEF identifier, a specific value, or a revocation cause value. The revocation cause value indicates an authorization revocation cause.

Optionally, the processing unit 901 is further configured to:

when the authorization revocation request message further carries an API identifier, revoke authorization to invoke an API corresponding to the API identifier by the API invocation entity; or when the authorization revocation request message further carries an API identifier and an AEF identifier, revoke authorization to invoke, by the API invocation entity, an API that is on an AEF corresponding to the AEF identifier and that is corresponding to the API identifier.

Optionally, the authorization revocation request message carries no API identifier, and the processing unit 902 is further configured to:

revoke authorization to invoke all APIs on a CCF corresponding to the API invocation entity by the API invocation entity; or when the authorization revocation request message further carries an AEF identifier, revoke authorization to invoke all APIs on an AEF corresponding to the AEF identifier by the API invocation entity; or when the authorization revocation request message further carries a specific value, revoke authorization to invoke all APIs on a CCF corresponding to the API invocation entity by the API invocation entity.

Optionally, the apparatus further includes:

a sending unit 903, configured to send an authorization revocation indication message to the API invocation entity. The authorization revocation indication message may carry at least one piece of the following information: an API identifier, an AEF identifier, a specific value, or a revocation cause value.

Optionally, the first entity is an AEF, and the second entity is a CCF corresponding to the API invocation entity; or the first entity is a CCF corresponding to the API invocation entity, and the second entity is an AEF.

Optionally, the first entity is a CCF corresponding to the API invocation entity, the second entity is an AEF, and the processing unit is further configured to:

after revoking the authorization to invoke all the APIs on the CCF corresponding to the API invocation entity by the API invocation entity, send an authorization revocation notification message to an AEF corresponding to the CCF, where the authorization revocation notification message carries the identifier of the API invocation entity.

The apparatus provided in this embodiment receives the authorization revocation request message from the second entity, where the authorization revocation request message carries the identifier of the API invocation entity; and sends the authorization revocation response message to the second entity based on the authorization revocation request message. Therefore, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Figure 10:
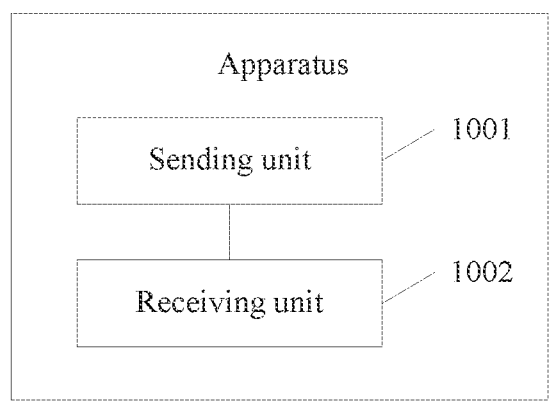
FIG. 10 is a schematic structural diagram of another apparatus according to an embodiment of this application.

As shown in FIG. 10, an embodiment of this application provides another apparatus. The apparatus may be a second entity, or may be located in the second entity, for example, may be one or more chips or systems on chip. The apparatus may be configured to perform an action of the second entity in the embodiment shown in FIG. 3, or may be configured to perform an action of the AEF in the embodiment shown in FIG. 4, or may be configured to perform an action of the CCF in the embodiment shown in FIG. 5. No limitation is imposed.

The apparatus may specifically include a sending unit 1001 and a receiving unit 1002. Details are as follows:

The sending unit 1001 is configured to send an authorization revocation request message to a first entity, where the authorization revocation request message carries an identifier of an API invocation entity.

The receiving unit 1002 is configured to receive an authorization revocation response message from the first entity, where the authorization revocation response message indicates that authorization revocation succeeds or fails.

Optionally, the apparatus further includes:

a processing unit 1003, configured to send the authorization revocation request message to the first entity by using the sending unit based on authorization revocation related information of the API invocation entity.

Optionally, the authorization revocation related information may include a quantity of times of API invocation failure, and the processing unit 1003 is further configured to: when the quantity of times of API invocation failure exceeds a threshold, send the authorization revocation request message to the first entity by using the sending unit.

Optionally, the authorization revocation request message further carries at least one piece of the following information: an API identifier, an AEF identifier, a specific value, or a revocation cause value. The revocation cause value indicates an authorization revocation cause.

Optionally, the first entity is an AEF, and the second entity is a CCF; or the first entity is a CCF, and the second entity is an AEF.

Optionally, the second entity is an AEF, and the first entity is a CCF.

The receiving unit 1001 is further configured to receive an API invocation request message from the API invocation entity.

The sending unit 1002 is further configured to: when the API invocation entity has no authorization to invoke an API that the API invocation request message is used to request to invoke, send an API invocation reject message to the API invocation entity.

Optionally, the sending unit 1002 is further configured to send an authorization revocation indication message to the API invocation entity.

The apparatus provided in this embodiment sends the authorization revocation request message to the first entity, where the authorization revocation request message carries the identifier of the API invocation entity; and receives the authorization revocation response message from the first entity, where the authorization revocation response message indicates that authorization revocation succeeds or fails. Therefore, API invocation authorization management is improved, so that API invocation authorization can be revoked in a timely manner, thereby avoiding resource waste caused by invoking an API by an API invocation entity that already has no API invocation authorization (in other words, authorization of the API invocation entity has been invalidated or has expired). For example, the API invocation entity invokes the API with original authorization, and an AEF executes service logic for the API invocation, but the API invocation finally fails. Consequently, processing resources of the AEF are wasted. In addition, the AEF is prevented from executing the service logic for the API invocation of the API invocation entity that already has no API invocation authorization, thereby improving working efficiency of a CAPIF system.

Figure 11:
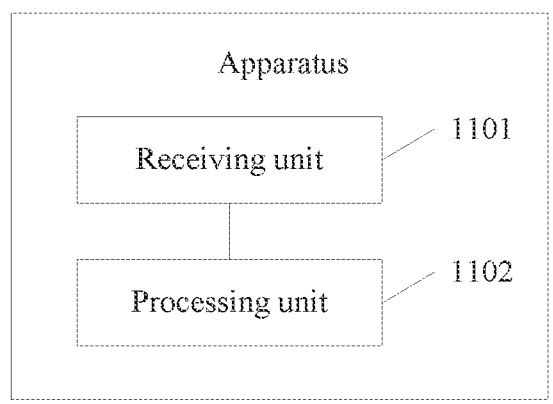
FIG. 11 is a schematic structural diagram of another apparatus according to an embodiment of this application.

As shown in FIG. 11, an embodiment of this application provides still another apparatus. The apparatus may be an AEF, or may be located in the AEF, for example, may be one or more chips or systems on chip. The apparatus may be configured to perform the method in the embodiment shown in FIG. 7. The apparatus may include a receiving unit 1101 and a processing unit 1102. Details are as follows:

The receiving unit 1101 is configured to receive an authorization revocation notification message from a CCF.

The processing unit 1102 is configured to update API invocation authorization information of an API invocation entity based on the authorization revocation notification message.

Figure 12:
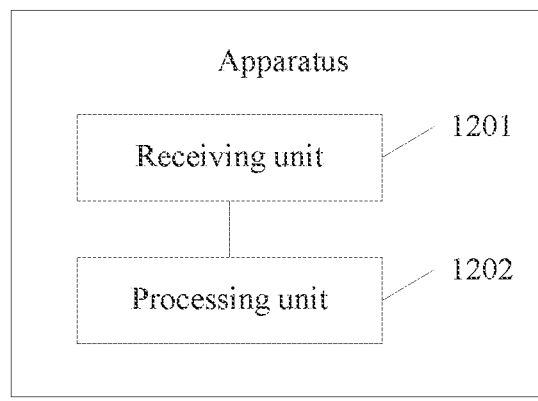
FIG. 12 is a schematic structural diagram of another apparatus according to an embodiment of this application.

As shown in FIG. 12, an embodiment of this application provides still another apparatus. The apparatus may be an API invocation entity, or may be located in the API invocation entity, for example, may be one or more chips or systems on chip. The apparatus may be configured to perform the method in the embodiment shown in FIG. 8. The apparatus may include a receiving unit 1201 and a processing unit 1202. Details are as follows:

The receiving unit 1201 is configured to receive an authorization revocation indication message from a first entity.

The processing unit 1202 is configured to update API invocation authorization information based on the authorization revocation indication message.

The first entity may be an AEF or a CCF. No limitation is imposed.

The apparatus provided in this embodiment receives the authorization revocation indication message from the first entity, and updates the API invocation authorization information based on the authorization revocation indication message, so that the API invocation entity can learn of authorization information of the API invocation entity in a timely manner, thereby avoiding the following two cases: Because the API invocation entity still invokes an API with original authorization when the API invocation entity cannot know that authorization information for invoking the API by the API invocation entity has been invalidated/revoked, an AEF executes service logic for the API invocation, but the API invocation finally fails, and consequently processing resources of the AEF are wasted. In addition, because the API invocation entity still attempts to invoke the API with the original authorization when the API invocation entity cannot know that the authorization of the API invocation entity is invalidated or expires, processing resources of the API invocation entity are wasted.

Figure 13:
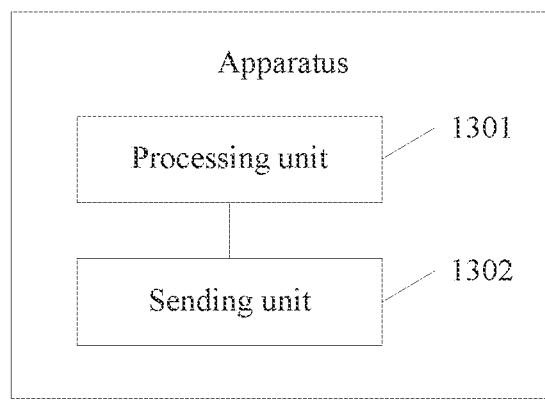
FIG. 13 is a schematic structural diagram of another apparatus according to an embodiment of this application.

As shown in FIG. 13, an embodiment of this application provides still another apparatus. The apparatus may be an AEF, or may be located in the AEF, for example, may be one or more chips or systems on chip. The apparatus may be configured to perform an action of the AEF in the embodiment shown in FIG. 6. The apparatus may include a processing unit 1301 and a sending unit 1302. Details are as follows:

The processing unit 1301 is configured to revoke API invocation authorization of an API invocation entity based on authorization revocation related information of the API invocation entity.

The sending unit 1302 is configured to send an authorization revocation notification message to a CCF.

The sending unit 1302 is further configured to send an authorization revocation indication message to the API invocation entity.

According to the apparatus provided in this embodiment, a status of the API invocation entity is monitored in real time to implement authorization revocation for the API invocation entity.

It should be noted that, the receiving unit in this application may be replaced with a communications interface, and the sending unit may be replaced with a communications interface. The communications interface may perform communication in a wired or wireless manner. When the apparatus mentioned above is a chip or a system on chip, the communications interface mentioned above may be an I/O interface, or may be a bus interface. In addition, the communications interface that the receiving unit is replaced with and the communications interface that the sending unit is replaced with may be the same or different. No limitation is imposed. The processing unit may be replaced with one or more processors, for example, may be a central processing unit (CPU), may be an application-specific integrated circuit (ASIC), or may be one or more integrated circuits configured to implement the embodiments of the present application, for example, one or more microprocessors (DSP) or one or more field programmable gate arrays (FPGA). No limitation is imposed.

Figure 14:
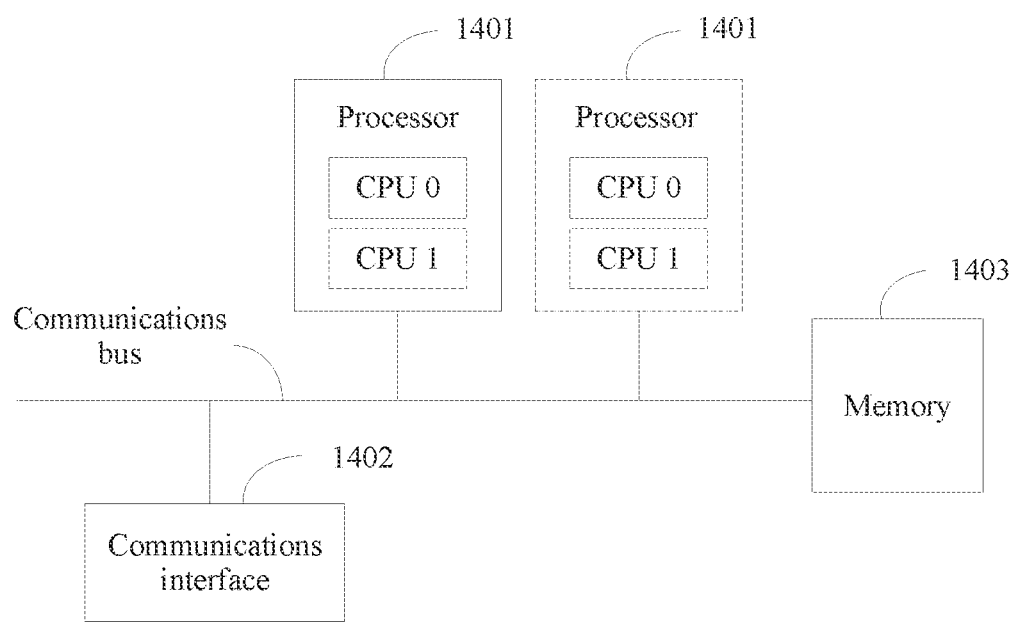
FIG. 14 is a schematic structural diagram of hardware of an apparatus according to an embodiment of this application.

As shown in FIG. 14, an embodiment provides still another apparatus. The apparatus may include a processor 1401 and a communications interface 1402. The processor 1401 is coupled to a memory. The processor 1401 is configured to invoke a program in the memory, to perform an action of each apparatus in the foregoing embodiments, for example, a first entity, an AEF, a CCF, or an API invocation entity.

There may be one or more processors 1401. For details, refer to the foregoing related descriptions.

The communications interface 1402 is used by the processor 1401 to communicate with the memory.

Optionally, the apparatus includes a memory 1403. The memory 1403 is coupled to the processor 1401, and there may be specifically one or more memories 1403. The memory 1403 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 1403 is not limited thereto.

The memory 1403 and the processor 1401 may communicate with each other by using the communications interface 1402. No limitation is imposed.

An embodiment of this application provides a program. When being executed by a processor, the program is used to perform the method of the apparatus in the foregoing embodiments.

An embodiment of this application provides a computer readable storage medium, including the foregoing program.

An embodiment of this application provides a system, including a first entity and a second entity. The first entity may be configured to perform an action in the embodiment shown in FIG. 2, and the second entity may be configured to perform an action in the embodiment shown in FIG. 3. Further, the system may further include an API invocation entity. The API invocation entity may be configured to perform a corresponding action in the embodiment shown in FIG. 8. Details are not described again.

An embodiment of this application provides another system, including an AEF and a CCF. The AEF and the CCF each may be configured to perform a corresponding action in the embodiment shown in FIG. 6.

Method or algorithm steps described with reference to the content disclosed in this application may be implemented by using hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. An example storage medium is coupled to a processor, so that the processor can read information from the storage medium and may write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In addition, the displayed or discussed mutual couplings or direct couplings or communication connections may be implemented by using some interfaces. The indirect couplings or communication connections between the apparatuses or units may be implemented in electrical or other forms.

Based on the descriptions of the foregoing implementations, a person skilled in the art may clearly understand that this application may be implemented by using software in addition to necessary universal hardware or by using hardware only. In most circumstances, the former is a better implementation. Based on such an understanding, the technical solutions of this application essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of this application.

What is claimed is:

1. An authorization revocation method, comprising:
    receiving, by a first entity, an authorization revocation request message from a second entity, wherein the authorization revocation request message carries an identifier of an application programming interface (API) invocation entity and a revocation cause value, and wherein the revocation cause value indicates an authorization revocation cause; and
    sending, by the first entity, an authorization revocation response message to the second entity based on the authorization revocation request message, wherein the authorization revocation response message indicates that authorization revocation succeeds or fails.

2. The method according to claim 1, wherein the authorization revocation request message further carries an API identifier.

3. The method according to claim 1, wherein the authorization revocation request message further carries an API identifier, and the authorization revocation request message requests the first entity to revoke authorization of the API invocation entity for an API corresponding to the API identifier.

4. The method according to claim 3, wherein the authorization of the API invocation entity for the API comprises an authorization of the API invocation entity to invoke the API corresponding to the API identifier.

5. The method according to claim 3, wherein the method further comprises:
revoking, by the first entity, the authorization of the API invocation entity for the API corresponding to the API identifier.

6. The method according to claim 1, wherein the authorization revocation request message comprises a revoke API invoker authorization request.

7. The method according to claim 1, wherein the method further comprises:
sending, by the first entity, an authorization revocation indication message to the API invocation entity.

8. The method according to claim 7, wherein the authorization revocation indication message carries at least one piece of the following information: an API identifier or the revocation cause value.

9. The method according to claim 7, wherein the authorization revocation indication message comprises a revoke API invoker authorization notify message.

10. The method according to claim 7, wherein the authorization revocation indication message carries an API identifier, and the authorization revocation indication message indicates that authorization of the API invocation entity for the API corresponding to the API identifier is revoked.

11. The method according to claim 1, wherein the authorization revocation response message comprises a revoke API invoker authorization response.

12. The method according to claim 1, wherein:
the first entity is an API exposing function (AEF), and the second entity is a common API framework core function (CCF) corresponding to the API invocation entity; or
the first entity is a CCF corresponding to the API invocation entity, and the second entity is an AEF.

13. An authorization revocation method, comprising:
sending, by a second entity, an authorization revocation request message to a first entity, wherein the authorization revocation request message carries an identifier of an application programming interface (API) invocation entity and a revocation cause value, and wherein the revocation cause value indicates an authorization revocation cause; and receiving, by the second entity, an authorization revocation response message from the first entity, wherein the authorization revocation response message indicates that authorization revocation succeeds or fails.

14. The method according to claim 13, wherein the authorization revocation request message further carries an API identifier.

15. An apparatus, wherein the apparatus is a first entity or is located in the first entity, and the apparatus comprises:
at least one processor; and
one or more memories coupled to the at least one processor and storing programming instructions for execution by the at least one processor to:
receive an authorization revocation request message from a second entity, wherein the authorization revocation request message carries an identifier of an application programming interface (API) invocation entity and a revocation cause value, and wherein the revocation cause value indicates an authorization revocation cause; and
send an authorization revocation response message to the second entity based on the authorization revocation request message, wherein the authorization revocation response message indicates that authorization revocation succeeds or fails.

16. The apparatus according to claim 15, wherein the authorization revocation request message further carries an API identifier.

17. The apparatus according to claim 15, wherein the authorization revocation request message further carries an API identifier, and the authorization revocation request message requests the first entity to revoke authorization of the API invocation entity for an API corresponding to the API identifier.

18. The apparatus according to claim 15, wherein the authorization revocation request message comprises a revoke API invoker authorization request.

19. An apparatus, wherein the apparatus is a second entity or is located in the second entity, and the apparatus comprises:
at least one processor; and
one or more memories coupled to the at least one processor and storing programming instructions for execution by the at least one processor to:
send an authorization revocation request message to a first entity, wherein the authorization revocation request message carries an identifier of an application programming interface (API) invocation entity and a revocation cause value, and wherein the revocation cause value indicates an authorization revocation cause; and
receive an authorization revocation response message from the first entity, wherein the authorization revocation response message indicates that authorization revocation succeeds or fails.

20. The apparatus according to claim 19, wherein the authorization revocation request message further carries an API identifier.

* * * * *